3,486,842
PROCESS FOR REMOVING VANADIUM FROM IRON ORES

Eugene J. Michal, Metuchen, N.J., assignor to National Lead Company, New York, N.Y., a corporation of New Jersey
No Drawing. Filed May 22, 1967, Ser. No. 640,407
Int. Cl. C22b 55/00; C01g 31/00, 49/00
U.S. Cl. 23—15      5 Claims

ABSTRACT OF THE DISCLOSURE

This invention relates to a process for removing the vanadium values from a vanadium bearing iron ore. The process comprises roasting the ore in a two-step operation in the presence of an alkali metal salt and subsequently water leaching the roasted ore to obtain a high yield of the vanadium values in soluble form in the leach liquor.

BACKGROUND OF THE INVENTION

Many roasting and leaching methods are well-known in the prior art for removing the vanadium values from a vanadium bearing iron ore.

In most of the prior art processes, however, the recovery of the vanadium values in the leach liquor is lower than desired.

SUMMARY OF THE INVENTION

In the instant process high vanadium recoveries are obtained from vanadium bearing iron ore. The ore is admixed with an alkali metal compound and formed into pellets or nodules and roasted in a two step heating operation to form the maximum amount of water soluble alkali metal vanadate in the pellet and upon leaching high recoveries of the vanadium values are obtained in the leach liquor.

The roasted pellets may be leached with or without crushing. In either case the vanadium recoveries are very high. If the roasted ore pellets are leached without crushing, the leached pellets are strong enough to be added to a blast furnace operation without crumbling.

These advantageous effects are obtained by the instant process which comprises admixed finely divided vanadium bearing iron ore with an alkali metal compound selected from the group consisting of sodium and potassium, and pelletizing the same, subjecting the pelletized mixture to an oxidizing heat treatment to temperature from 700° F. to 1950° F. to oxidize and harden the pellets, then further subjecting the pellets to an additional heat treatment at 2200° F. to 2450° F. to further harden or sinter the pellets and to form the maximum amount of a water soluble alkali metal vanadate in the pellets, leaching the roasted material with water at 140° F. to 180° F. to solubilize the alkali metal vanadate values.

DESCRIPTION OF THE PREFERRED EMBODIMENT

In carrying out the instant process, the vanadium bearing iron ore is usually wet ground to minus 200 mesh, preferably to at least 70% minus 325 mesh. The ground ore is then intimately mixed with the sodium and potassium compound and the mixture is then formed into nodules or pellets preferably by rolling. Pellets of a size from ¼ inch to ¾ inch are particularly desirable.

The amount of alkali metal compound employed may vary considerably however it has been found that amounts from 2% to 5% on an ore weight basis are particularly satisfactory.

Any alkali metal compound of sodium and potassium may be employed. Since sodium compounds are usually cheaper than potassium compounds, sodium carbonates, sodium sulfate and sodium chloride are particularly useful for economic reasons.

The pellets when formed usually contain about 5 to 15% water. After drying, the pellets are then heated under oxidizing conditions at a temperature from 700° F. to 1950° F. to oxidize and to harden the pellet so that they can be introduced into a high temperature furnace, such as a shaft, furnace, without crumbling. The time of the oxidizing heat treatment should be at least 15 minutes at 700° F. or at least 5 minutes at 1950° F. Times of heating up to two hours are not detrimental except for economy reasons. Although this oxidizing and heating operation may be carried out in many types of apparatus, a particularly useful type is one in which the pellets are placed on a moving grate and are oxidized by passing a blast of heated air or oxidizing gases through the moving grate.

After the pellets have been oxidized and hardened, they are then further heated to a temperature from 2200° F. to 2450° F. and held at that temperature for at least 30 minutes. During this treatment, the pellets are further hardened or sintered and at the same time the maximum amount of the water soluble alkali metal vanadate compound is formed in the pellets.

After cooling the hardened pellets with or without crushing, they are leached thoroughly with water to form an alkali metal vanadate leach liquor.

In order to describe more fully the instant invention the following examples are presented:

EXAMPLE 1

A magnetite iron ore concentrate containing 0.43% vanadium on an ore weight basis, was wet ground to 80% minus 325 mesh. The ground ore was filtered and the filter cake contained about 10% water. Sodium carbonate equivalent to three percent by weight on a dry ore basis was added to the moist filter cake and the mixture was rolled in a mixer to form nodules or pellets. The pellets were screened and the ¼ inch to ¾ inch size were recovered, the over-size and under-size returned until the entire amount fell within the size range recited above.

These pellets were then placed in a drying oven and dried at 230° F. After drying they were then heated to 1000° F. in a current of heated air and held at that temperature for 15 minutes.

At the end of this oxidizing heat treament the pellets were introduced into a furnace where they were immediately heated to 2420° F. and the pellets were sintered to form firm lumps.

These sintered lumps were then crushed through a 20 mesh screen and leached thoroughly with water at 140–180° F. The leached residue was analyzed for vanadium and it was found that 88.4% of the vanadium values had been removed.

EXAMPLES 2–5

In Examples 2–5 the procedures of Example 1 was repeated except that different temperatures and times were used for the oxidizing heat treatments.

EXAMPLES 6–9

In Examples 6–9 various compounds of sodium were used in varying amounts on several ores, and the pellets were leached whole, not crushed. In these examples the oxidation heat treatments were carried out at temperatures which started at 800° F. and rose to 1670° F. The time of the oxidation heat treatments within this temperature range was 60 minutes. The operational details and the results obtained are recorded in the following table along with the results obtained in Example 1. In all of these examples the recoveries of the vanadium values were exceptionally high, even though in Examples 6–9 the pellets were leached without crushing. These leached whole pellets were strong enough to be able to withstand handling in a blast furnace without crumbling.

EXAMPLES 10–13

In these examples various compounds of sodium and potassium were used in varying amounts. The procedure of the preceding examples was followed except that instead of pelletizing the mixture of ore and sodium or potassium salt, it was pressed into wafers one inch in diameter and about one quarter of an inch thick. These wafers were heated and leached in accordance with the procedures of the previous examples as indicated in the table.

In order to show the advantages obtained using the process of the instant invention over the prior art sintering processes, the following example is presented as a prior art control run.

EXAMPLE 14

In this example the pellets were prepared in the same manner as that described in Example 1 except that the dried pellets were added directly to a commercial iron ore pellet shaft furnace without any preheating or oxidizing treatment. The pellets were brought to peak temperature almost immediately and after passing through the furnace were recovered and leached with water in the same manner as that previously described. In this particular control run the vanadium recovery was only 72.1% which clearly shows that the preheating or oxidizing step of the instant invention is necessary to obtain high vanadium recoveries. The operational details and the results obtained are recorded in the following table.

What I claim is:

1. Process for removing vanadium from iron ores which comprises admixing finely divided vanadium bearing magnetite iron ore with 2% to 5% by weight of an alkali metal compound selected from the group consisting of sodium carbonate, sodium sulfate, sodium chloride, potassium carbonate, potassium sulfate and potassium chloride and pelletizing the same subjecting the pelletized mixture to an oxidizing heat treatment at temperature from 700° F. to 1950° F. to oxidize and harden the pellets, the time of heat treatment being at least 15 minutes when a temperature of 700° F. is employed and the heat treatment time being at least 5 minutes when 1950° F. is employed, then further subjecting the pellets to an additional heat treatment at 2200° F. to 2450° F. to sinter the pellets and to form the maximum amount of a water soluble alkali metal vanadate in said pellets, the time of the additional heat treatment being at least 30 minutes at 2200° F. to 2450° F., leaching the roasted material with water to solubilize the alkali metal vanadate values.

2. Process according to claim 1 in which the amount of alkali metal compound admixed with the finely divided ore to form the pellets is from 2% to 5% by weight on an ore basis.

3. Process according to claim 1 in which the alkali metal compound is sodium carbonate.

4. Process according to claim 1 in which the alkali metal compound is potassium carbonate.

5. Process according to claim 1 in which the roasted pellets are leached in water without crushing.

TABLE

| Examples | 1 | 2 | 3 | 4 | 5 | 6 | 7 |
|---|---|---|---|---|---|---|---|
| Ore, percent vanadium | 0.43 | 0.43 | 0.43 | 0.43 | 0.46 | 0.52 | 0.54 |
| Additive: | | | | | | | |
| Alkali metal compound used | $Na_2CO_3$ | $Na_2CO_3$ | $Na_2CO_3$ | $Na_2CO_3$ | $Na_2CO_3$ | $Na_2CO_3$ | $Na_2CO_3$ |
| Percent on ore basis | 3 | 3 | 3 | 3 | 3 | 2 | 3 |
| Oxidizing heat treatment: | | | | | | | |
| Temp., °F | 1,000 | 1,000 | 1,400 | 1,800 | 800 | 800–1,670 | 800–1,670 |
| Time, min | 15 | 60 | 30 | 30 | 60 | 60 | 60 |
| Final heat treatment: | | | | | | | |
| Temp., °F | 2,420 | 2,420 | 2,420 | 2,420 | 2,370 | 2,370 | 2,240 |
| Time, min | 60 | 60 | 60 | 60 | 60 | 60 | 60 |
| Water leaching: | | | | | | | |
| Pellets whole or crushed | Crushed | Crushed | Crushed | Crushed | Crushed | Whole | Whole |
| Time, hrs | 1.0 | 1.0 | 1.0 | 1.0 | 2.0 | 6.0 | 5.0 |
| Temp., °F | 140–180 | 140–180 | 140–180 | 140–180 | 180 | 180 | 160–180 |
| Vanadium recovered in leach liquor, percent | 88.4 | 90.7 | 90.7 | 86.0 | 85.4 | 88.5 | 85.2 |

| Examples | 8 | 9 | 10 | 11 | 12 | 13 | 14 Control run |
|---|---|---|---|---|---|---|---|
| Ore, percent vanadium | 0.52 | 0.43 | 0.54 | 0.54 | 0.54 | 0.54 | 0.43 |
| Additive: | | | | | | | |
| Alkali metal compound used | $Na_2CO_3$ | $Na_2CO_3$ | NaCl | $K_2SO_4$ | $K_2CO_3$ | KCl | $Na_2CO_3$ |
| Percent on ore basis | 4 | 5 | 5 | 3 | 3 | 5 | 3 |
| Oxidizing heat treatment: | | | | | | | |
| Temp., °F | 800–1,670 | 800–1,670 | 800–1,670 | 800–1,670 | 800–1,670 | 800–1,670 | None |
| Time, min | 60 | 60 | 60 | 60 | 60 | 60 | |
| Final heat treatment: | | | | | | | |
| Temp., °F | 2,370 | 2,190 | 2,240 | 2,240 | 2,240 | 2,240 | 2,350 |
| Time, min | 60 | 120 | 60 | 60 | 60 | 60 | 60 |
| Water leaching: | | | | | | | |
| Pellets whole or crushed | Whole | Whole | Crushed | Crushed | Crushed | Crushed | Whole | Crushed |
| Time, hrs | 6.0 | 4.0 | 2.0 | 2.0 | 2.0 | 2.0 | 40.0 | 40.0 |
| Temp., °F | 180 | 140–180 | 180 | 180 | 180 | 180 | 160 | 160 |
| Vanadium recovered in leach liquor, percent | 90.5 | 86.0 | 88.5 | 90.5 | 93.0 | 84.6 | 67.4 | 72.1 |

References Cited

UNITED STATES PATENTS 3,259,455  7/1966  Koerner et al. _____ 23—15
3,376,103  4/1968  Henrickson et al. _____ 23—15

HERBERT T. CARTER, Primary Examiner

U.S. Cl. X.R.

23—18, 51